US012792385B2

(12) United States Patent
Fogaren, Jr.

(10) Patent No.: US 12,792,385 B2
(45) Date of Patent: Nov. 10, 2026

(54) PROVISIONING SERVICE TO SET UP A CLUSTER OF VIRTUALIZATION PROGRAMS IN COMPUTE SERVERS

(71) Applicant: HEWLETT PACKARD ENTERPRISE DEVELOPMENT LP, Spring, TX (US)

(72) Inventor: David C. Fogaren, Jr., Andover, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 466 days.

(21) Appl. No.: 18/527,052

(22) Filed: Dec. 1, 2023

(65) Prior Publication Data

US 2025/0181374 A1 Jun. 5, 2025

(51) Int. Cl.
*G06F 9/455* (2018.01)

(52) U.S. Cl.
CPC .................... *G06F 9/45558* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS 10,437,647 B2 10/2019 Tseng et al.
11,153,155 B1 10/2021 Perez
11,811,596 B1 * 11/2023 Bruno ................. H04L 41/0806
2006/0294587 A1 * 12/2006 Bowden .................. G06F 21/57 726/22
2018/0241763 A1 * 8/2018 Ertugrul .................. H04L 69/22
2020/0192899 A1 * 6/2020 Joshi ................. G06F 16/24552
2020/0310670 A1 * 10/2020 Bao ....................... G06F 3/0673
2021/0048796 A1 * 2/2021 Rieger ..................... G06F 21/82
2021/0168143 A1 * 6/2021 Mitchell ............... H04W 12/67
2021/0184930 A1 6/2021 Mutnuru et al.
2023/0229452 A1 * 7/2023 Daffara ................. G06F 9/4403 713/1
2023/0229475 A1 * 7/2023 Todorov ................ G06F 9/4881 718/1
2023/0229778 A1 7/2023 Terpstra et al.
2023/0289193 A1 * 9/2023 Guntupalli ............ H04W 24/08

OTHER PUBLICATIONS

Cisco; "Cisco SD-WAN: WAN Edge Onboarding Prescriptive Deployment Guide"; Jan. 2020; 100 pages.

* cited by examiner

*Primary Examiner* — Wynuel S Aquino
(74) *Attorney, Agent, or Firm* — Trop, Pruner & Hu, P.C.

(57) ABSTRACT

In some examples, a provisioning service detects that a plurality of compute servers are online at an edge site, where the plurality of compute servers are pre-loaded with virtualization programs at an installation site different from the edge site. The provisioning service obtains network information and security information of the plurality of compute servers from a data repository, and verifies the plurality of compute servers using the security information obtained from the data repository. After verifying the plurality of compute servers, the provisioning service performs a configuration process to set up a cluster of the virtualization programs in the plurality of compute servers, where the configuration process uses the network information obtained from the data repository.

20 Claims, 5 Drawing Sheets

PROVISIONING SERVICE TO SET UP A CLUSTER OF VIRTUALIZATION PROGRAMS IN COMPUTE SERVERS

BACKGROUND

Cloud computing refers to the delivery of services from a remote location over a network to customers of a cloud provider that manages a cloud computing infrastructure. The customers are able to obtain resources of the cloud computing infrastructure on demand to perform the workloads of the customers.

BRIEF DESCRIPTION OF THE DRAWINGS

Some implementations of the present disclosure are described with respect to the following figures.

Figure 1:
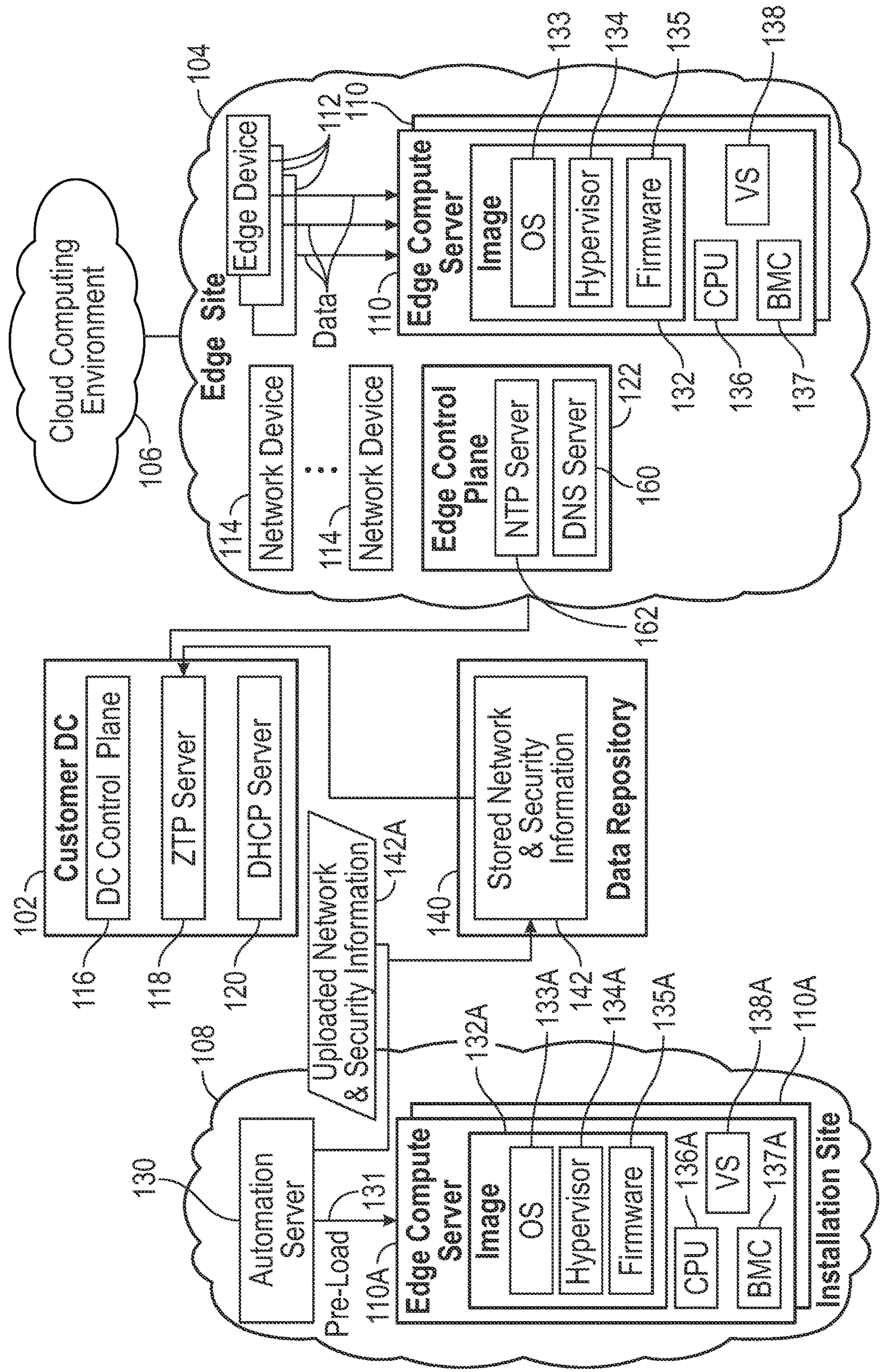
FIG. 1 is a block diagram of an arrangement that includes an edge site, a customer data center, an installation site, and a cloud computing environment, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A "customer" of a cloud computing infrastructure can refer to an individual user, an organization with multiple users, or any other entity (whether a human, a machine, or a program) that is capable of requesting use of a resource of a computing infrastructure.

A customer may also operate edge devices that produce (collect or generate) information, where the produced information may be provided to the cloud computing infrastructure for processing as part of workloads performed for the customer. Edge devices are located at edge sites. An "edge site" refers to a physical location that includes devices that produce information that is to be processed in workloads, where the physical location of the edge site is remote from the cloud computing infrastructure. The cloud computing infrastructure can be implemented with cloud resources that may be physically present at one or more physical locations. The edge site is remotely located from such physical location(s).

Examples of edge devices at an edge site can include sensors, Internet of Things (IoT) devices, or other electronic devices capable of producing information to be processed. In some cases, a customer may operate a large number of edge sites (e.g., retail stores, data collection sites, or other types of sites) that can produce large amounts of information. If the large amounts of information are all sent to a cloud computing infrastructure for processing, communication latency issues may arise due to increased usage of networks used for communications of the information from edge devices over the networks to the cloud computing infrastructure. Moreover, resources at the cloud computing infrastructure may be overburdened if the large amounts of information are to be processed in a narrow time window.

Edge-to-cloud computing may be implemented to deploy edge compute servers at an edge site. An edge compute server is able to perform workloads that process information produced locally at the edge site. In some cases, workloads performed by edge compute servers at the edge site can interact with workloads performed at the cloud computing infrastructure. For example, output information produced by the workloads at the edge compute servers can be provided to the cloud computing infrastructure to be further processed by workloads at the cloud computing infrastructure.

Provisioning edge compute servers at edge sites can be associated with various challenges. For example, skilled technical personnel may not be available at an edge site to perform provisioning of edge compute servers. Additionally, network connections to edge sites may have restricted bandwidth such that remote provisioning of large numbers of edge compute servers at edge sites may overwhelm the network connections. Additionally, edge sites may not be secure such that edge compute servers at the edge sites may be compromised before the edge compute servers are operated.

In accordance with some implementations of the present disclosure, an automated provisioning service is provided to provision compute servers at an edge site without human interaction or with reduced human interaction during the provisioning process. Such an automated provisioning service can also be referred to as a zero-touch provisioning (ZTP) service. To reduce the amount of provisioning workload when compute servers are deployed at an edge site, the compute servers can be pre-loaded with a program image (including operating systems (OSes), virtualization programs, and/or firmware, for example) at an installation site that is different from the edge site where the compute servers are to be deployed. The installation site can refer to a site where the compute servers are made, assembled, or otherwise initially configured. An automation server at the installation site can upload network information and security information of the compute servers to a data repository, where the security information can be obtained by the ZTP service from the data repository to verify the compute servers using the security information once the compute servers are deployed at the edge site. After verifying the compute servers, the ZTP service performs a configuration process to set up a cluster of the virtualization programs in the compute servers.

A "compute server" can refer to a collection of processing resources. As used here, a "collection" of items can refer to a single item or multiple items. Thus, a collection of processing resources can include one processing resource or multiple processing resources. Examples of processing resources include any or some combination of the following: computers, processors, cores of multi-core processors, microcontrollers, programmable integrated circuits, programmable gate arrays, or other hardware processing circuits.

A "virtualization program" can refer to a program that starts virtualized environments in one or more compute servers. A "virtualized environment" refers to a computing environment deployed in a compute server that is able to execute machine-readable instructions in the computing environment, where the machine-readable instructions are able to share physical resources (including processing resources, storage resources, input/output (I/O) resources, and/or other resources) of the compute server through a hypervisor or a host OS. A "host OS" refers to the primary OS of a compute server that manages access to the physical resources of the compute server. The host OS is distinguished from a guest OS (discussed below). Virtualized environments are isolated computing environments in which machine-readable instructions in one virtualized environment can execute independently of machine-readable instructions in another virtualized environment.

In some examples, a virtualized environment is a virtual machine (VM) started by a hypervisor (also referred to as a virtual machine monitor or VMM). The hypervisor is an example of a virtualization program. A VM includes a computing environment in which a guest OS and one or more application programs can execute. A "guest OS" refers to an OS that executes within the VM. Different VMs can execute respective different guest OSes. Guest OSes in different VMs can be of the same type or of different types. The hypervisor is able to present virtualized resources to VMs by emulating instances of physical resources of a compute server.

In other examples, a virtualized environment is a container in which one or more application programs can execute. Containers are started by a container engine, which interacts with an OS of a compute server to provide access by the containers to physical resources of the compute server. The container engine is another example of a virtualization program. Examples of container engines include any of the following: a Docker engine; a rkt (pronounced "rocket") container engine; a CRI-O container engine, where CRI-O is an Open Container Initiative (OCI) implementation of the Kubernetes Container Runtime Interface (CRI); or any other container engine.

A "cluster" of virtualization programs can refer to a group of virtualization programs that cooperate to provide virtualized environments (on different physical machines) to execute workloads across the virtualized environments. The virtualization programs of the cluster can cooperate to migrate virtualized environments (e.g., VMs or containers) between physical machines, and to assign portions of workloads to the virtualized environments.

"Provisioning" a compute server can refer to setting up the compute server so that the compute server is able to operate.

FIG. 1 is a block diagram of an example arrangement that includes a customer data center (DC) 102, an edge site 104, a cloud computing infrastructure 106, and an installation site 108. A "customer data center" can refer to a data center operated by a customer. The data center includes various resources, such as computers, storage systems, communication nodes, and other resources. The customer is a customer of the cloud computing infrastructure 106. In some examples, a provider of the cloud computing infrastructure 106 is different from the customer. In other examples, the provider of the cloud computing infrastructure 106 can be the same as the customer.

The edge site 104 is also operated by the customer. The edge site 104 is remotely located from the cloud computing infrastructure 106 and from the customer data center 102. Although FIG. 1 depicts one edge site, it is noted that in other examples, the customer can operate multiple edge sites, such as retail stores, data collection sites, and so forth.

In accordance with some implementations of the present disclosure, edge compute servers 110 can be deployed at the edge site 104, to execute workloads on data produced by edge devices 112 at the edge site 104. The edge compute servers 110 execute local workloads at the edge site 104 on data locally produced by the edge devices 112. The workloads executed by the edge compute servers 110 can interact with the workloads executed by resources of the cloud computing infrastructure 106. For example, the workloads executed by the edge computing servers 110 can produce output data provided to workloads in the cloud computing infrastructure 106 for further processing.

The edge site 104 also includes various network devices 114. The network devices 114 allow the components at the edge site 104 to communicate with entities outside the edge site 104, including the customer data center 102 and the cloud computing infrastructure 106. Examples of network devices 114 can include any or some combination of the following: switches, routers, or other types of communication devices that pass data from one device to another device.

The customer data center 102 includes a data center control plane 116, a ZTP server 118 that is able to perform zero touch provisioning of the edge compute servers 110 deployed at the edge site 104, and a Dynamic Host Configuration Protocol (DHCP) server 120. Although FIG. 1 shows the DHCP server 120 as being separate from the control plane 116, it is noted that in further examples the DHCP server 120 may be part of the data center control plane 116 in other examples. In further examples, the ZTP server 118 and/or the DHCP server 120 may be outside the customer data center 102.

The data center control plane 116 can perform various control tasks in the customer data center 102. In some examples, the data center control plane 116 can include a Domain Name System (DNS) server that translates a human readable domain name (e.g., a name of a website or other web resource) into a network address, such as an Internet Protocol (IP) address. Further, the data center control plane 116 can include a Network Time Protocol (NTP) server that provides time information to allow synchronization of clocks in electronic devices, including electronic devices in the customer data center 102 and in any edge sites. The data center control plane 116 can also log various information, such as information relating to activities of various entities, telemetry data including metrics relating to usage and/or performance of resources (e.g., processor usage or performance metrics, storage usage or performance metrics, information relating to errors or faults, network latency metrics, or other metrics), or other information.

As discussed further below, an edge control plane 122 can also be provided at the edge site 104, to provide local control plane tasks in the edge site 104.

The edge compute servers 110 are deployed at the edge site 104 after initial configuration at the installation site 108. The edge compute servers that are initially configured at the installation site are represented as edge compute servers 110A. The initial configuration of the edge compute servers 110A can be performed by a manufacturer, an assembler, or any other entity tasked with initial setup of edge compute servers. The entity that operates the installation site 108 may be different from the customer that operates the customer data center 102 and the edge site 104.

After the initial configuration of the edge compute servers 110A at the installation site 108, the edge compute servers 110A are moved (e.g., shipped) to the edge site 104 and deployed as the edge compute servers 110, where the edge compute servers 110 are configured further by the ZTP server 118.

At the installation site 108, an automation server 130 can pre-load (at 131) program images 132A into the edge compute servers 110A. The automation server 130 can be part of an installation system (including one or more computers) at the installation site 108 that is used to perform various setup tasks with respect to the edge compute servers 110A. The automation server 130 can include a program (e.g., a script or another type of program).

The pre-loaded program images 132A can include any or some combination of a host OS 133A, a hypervisor 134A, and firmware 135A. Examples of the firmware 135A can include Basic Input/Output System (BIOS) code, Unified Extensible Firmware Interface (UEFI) code, or other firmware. A pre-loaded program image 132A is stored in a storage medium of the edge compute server 110A. The storage medium can include any type of persistent storage medium, including any or some combination of a disk-based storage medium, a solid state drive, a nonvolatile memory, or another type of persistent storage.

By pre-loading the program image 132A into each edge compute server 110A at the installation site 108, less work would have to be performed by the ZTP server 118 once the edge compute servers 110 are deployed at the edge site 104. Loading program images (which can have a large size) onto a large quantity of edge compute servers 110 at the edge site 104 can overburden a network to the edge site 104. The pre-loading of program images 132A into edge compute servers 110A allows for more efficient configuration operations of the ZTP server 118.

As further depicted in FIG. 1, each edge compute server 110A includes a central processing unit (CPU) 136A and a baseboard management controller (BMC) 137A. The CPU 136A includes the processing circuitry of the edge compute server 110A that is to execute programs such as the host OS 133A, the hypervisor 134A, the firmware 135A, application programs (not shown), or other machine-readable instructions.

The BMC 137A is an example of a management processor that performs various management tasks with respect to the edge compute server 110A. Examples of management tasks of the BMC 137A are discussed further below.

In addition to pre-loading the program images 132A into respective edge compute servers 110A, the automation server 130 can also perform a basic configuration of the edge compute servers 110A at the installation site 108. For example, the basic configuration of an edge compute server 110A can include setting up a virtual switch (VS) 138A in the edge compute server 110A. The virtual switch 138A that is set up can be part of the hypervisor 134A, or the virtual switch 138A can be separate from the hypervisor 134A. The virtual switch 138A in the edge compute server 110A is able to contact the DHCP server 120 at the customer data center 102 once the edge compute server 110A is moved from the installation site 108 and deployed at the edge site 104. For example, the virtual switch 138A can be configured with the IP address of the DHCP server 120, such that a VM started in the edge compute server is able to contact the DHCP server 120 using this IP address.

Each edge compute server 110 deployed at the edge site 104 includes a pre-loaded program image 132 (as pre-loaded at the installation site 108) that includes one or more of host OS 133, a hypervisor 134, and firmware 135. The edge compute server 110 further includes a pre-configured virtual switch 138 (as configured at the installation site 108). Each edge compute server 110 deployed at the edge site 104 also includes a respective CPU 136 and BMC 137.

In addition to pre-loading the program image 132A and performing a basic configuration of each edge compute server 110A at the installation site 108, the automation server 130 can also upload network information and security information 142A to a data repository 140. The data repository 140 may be stored in a storage system (not shown). The data repository 140 may be at installation site 108 or outside installation site 108. Alternatively, the data repository 140 can be part of the customer data center 102.

The network information can include network addresses, such as Media Access Control (MAC) addresses, of the edge compute servers 110A. For example, the MAC addresses can include the MAC address of several network adapters in each edge compute server 110A. The network adapters can include any or some combination of: a physical network adapter of an edge compute server 110A, a virtual network adapter of the edge compute server 110A, or a network adapter in the BMC 137A of the edge compute server 110A. More generally, a "network adapter" can refer to a component (whether physical or virtual) that is responsible for communicating information over a network.

The network information can also include configuration information relating to the network devices 114 of the edge site 104. The configuration information relating to the network devices 114 can include port information identifying ports of the network devices 114 that are to be enabled, virtual local area network (VLAN) information, configuration parameters, and so forth.

The security information can include security parameters, including any or some combination of: user credentials (e.g., a username and password), an authentication key, a certificate, or any other type of security parameter that is used to support secure access of an edge compute server 110A or to ensure that the edge compute server 110A can be trusted. A user credential can be used to log into the edge compute server 110A. Alternatively, an authentication key, which can be according to a Secure Shell (SSH) protocol or another security protocol, used to log into the edge compute server 110A. A certificate, such as a platform certificate or an identity certificate, can be used to check that the edge compute server 110A has not been tampered with.

Although specific examples of network information and security information are listed above, in other examples, alternative or additional network information and security information can be included as part of the uploaded network and security information 142A.

The uploaded network and security information 142A sent from the automation server 130 can be persistently stored as stored network and security information 142 in the data repository 140. In some examples, the network information can be stored in a first data store (e.g., a GitHub store, a database, or another type of data store), while the security information can be stored in a more secure data store (e.g., a keystore or any other type of data store protected against unauthorized access).

Figure 2:
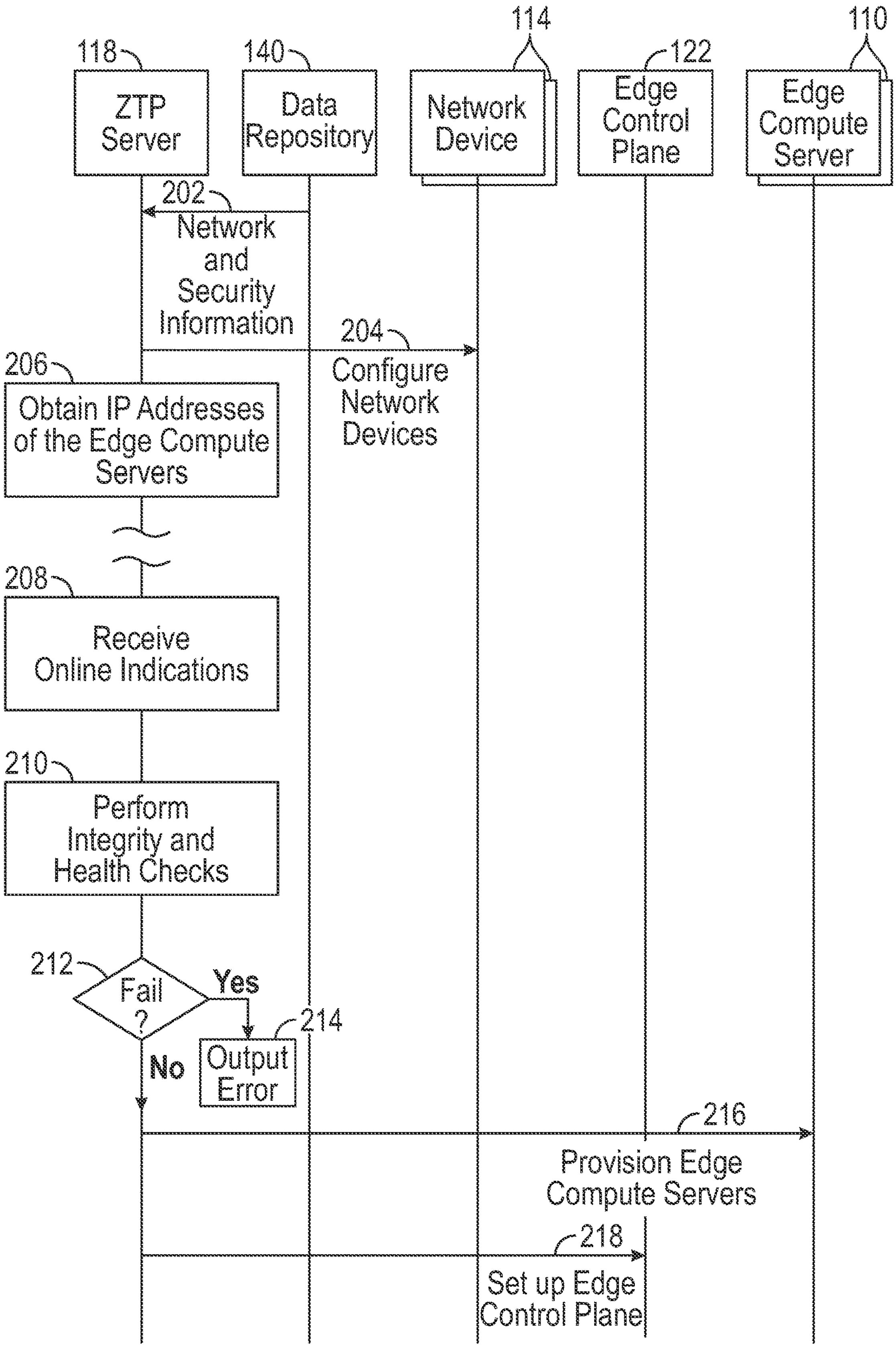
FIG. 2 is a flow diagram of a process involving various entities, in accordance with some examples.

The following discussion refers to both FIG. 1 and FIG. 2. FIG. 2 is a flow diagram of tasks performed by various entities in FIG. 1. Although the tasks are shown as being performed in a given order, in other examples, the tasks can be performed in a different order, some of the tasks may be omitted or replaced with other tasks, and/or additional tasks may be added.

The ZTP server 118 obtains (at 202) the stored network and security information 142 from the data repository 140. In some examples, the ZTP server 118 may be provided with an indication (e.g., a message, an information element in a message, etc.) that the stored network and security information 142 is available in the data repository 140, which can prompt the ZTP server 118 to read the stored network and security information 142 from the data repository 140. The indication may be received by the ZTP server 118 from the automation server 130, for example.

After obtaining (at 202) the stored network and security information 142 from the data repository 140, the ZTP server 118 can configure (at 204), using the network information, the network devices 114 to support communications between edge compute servers 110 at the edge site 104 and the customer data center 102. For example, the ZTP server 118 can enable, based on the port information included in the network information, ports of the network devices 114 (e.g., switch ports) that are to be used for communications between the edge site 104 and the customer data center 102. In some examples, the ZTP server 118 may configure, based on the VLAN information included in the network information, VLANs for each enabled port of the network devices 114. In further examples, the ZTP server 118 can configure, using the network information, parameters associated with the network devices 114, including any or some combination of the following: a maximum transmission unit (MTU) that specifies the size of the largest protocol data unit (PDU) that can be communicated, link aggregation parameters relating to aggregating physical links to the ports of the network devices into aggregate logical links, or other configuration parameters. Although the foregoing refers to examples of configurations of the network devices 114 that can be configured based on the network information obtained from the stored network and security information 142, other configurations of the network devices 114 can be performed in other examples.

In other examples, instead of the ZTP server 118 configuring the network devices 114, another entity, such as by the customer or another entity, to support communications between edge compute servers 110 at the edge site 104 and the customer data center 102. Alternatively, the ZTP server 118 can trigger the execution of a separate workflow to configure the network devices 114.

The ZTP server 118 also obtains (at 206) IP addresses of the edge compute servers 110. In some examples, the IP addresses may be part of static DHCP leases in which the same (static) IP address is assigned to a unique MAC address by the DHCP server 120. The unique MAC addresses include MAC addresses included in the network information of the stored network and security information 142. In such examples, the DHCP server 120 maintains a static mapping between IP addresses and MAC addresses. As noted above, the MAC addresses in the network information are collected by the automation server 130 and are assigned to various network adapters, such as a physical network adapter, a virtual network adapter, and a network adapter of a BMC.

The IP addresses can be part of a pool of IP addresses, and the ZTP server 118 can obtain the pool of IP addresses from the customer or another entity. After obtaining the pool of IP addresses, the ZTP server 118 can send the IP addresses to the DHCP server 120 to create the static DHCP leases. In other examples, the ZTP server 118 can obtain the IP addresses in a different way, such as by triggering a workflow that retrieves or generates IP addresses for static DHCP leases.

In other examples, instead of using static IP addresses, dynamic IP addresses are employed for the edge compute servers 110. In such latter examples, the ZTP server 118 can learn the dynamic IP addresses using any of various techniques. For example, the ZTP server 118 can access a compute operations manager to obtain the dynamic IP addresses. The compute operations manager is used to access, monitor, and manage services at compute servers.

The DHCP server 120 in such examples assigns dynamic IP addresses in response to DHCP requests containing MAC addresses of the edge compute servers 110. The compute operations manager is able to detect the dynamic IP addresses provided by the DHCP server 120 to the edge compute servers 110. The ZTP server 118 can access the compute operations manager, such as through an application programming interface (API) of the compute operations manager, to obtain the dynamic IP addresses of the edge compute servers 110.

In other examples, the ZTP server 118 can obtain the dynamic IP addresses of the edge compute servers 110 in a different way.

In some examples, the IP addresses (static or dynamic) of the edge compute servers 110 include management IP addresses used for management processes, including management processes of the BMCs 137 and management processes of host OSes 133.

A management process of a BMC 137 can be performed using the network adapter of the BMC 137. When the BMC 137 sends a DHCP request (including a MAC address of the network adapter of the BMC 137) to the DHCP server 120, the DHCP server 120 responds with the IP address assigned to the MAC address of the network adapter of the BMC 137.

A management process of a host OS 133 can be performed using the physical or virtual network adapter of an edge compute server 110 in which the host OS 133 executes. When the host OS 133 sends a DHCP request (including a MAC address of the physical or virtual network adapter of the edge compute server 110) to the DHCP server 120, the DHCP server 120 responds with the IP address assigned to the MAC address of the physical or virtual network adapter.

At some point, the edge compute servers 110 are deployed at the edge site 104. The edge compute servers 110 are installed at various locations in the edge site 104, and power is connected to the installed edge compute servers 110. Additionally, the edge compute servers 110 are connected wirelessly or by wired connections to the network devices 114.

The ZTP server 118 waits for the edge compute servers 110 to come online at the edge site 104. Note that the ZTP server 118 can provision edge compute servers at multiple edge sites. An edge compute server being "online" refers to the edge compute server being powered and having a network connection to enable communication with the edge compute server.

The ZTP server 118 receives (at 208) online indications indicating that the edge compute servers 110 have been deployed and are available at the edge site 104. The online indications can be received from any of various sources, which are discussed further below.

In response to the online indications, the ZTP server 118 performs (at 210) integrity and health checks of the edge compute servers 110. Various examples of integrity and health checks are provided below. In other examples, alternative or additional checks may be performed.

A check can be performed of the firmware configuration of an edge compute server. The firmware configuration includes a configuration of the BIOS code or UEFI code in the firmware 135 of an edge compute server 110, for example. Additionally, the firmware configuration may include an Option Read-Only Memory (ROM) configuration. An Option ROM contains firmware initiated by the BIOS or UEFI code during initialization. A firmware configuration can include various settings for the firmware 135. The ZTP server 118 can compare the firmware configuration (of the firmware 135 pre-loaded in the edge compute server 110) to a baseline firmware configuration. If the firmware configuration of the pre-loaded firmware does not match the baseline firmware configuration, the ZTP server 118 can indicate an error condition of the firmware 135.

The ZTP server 118 can also check certificates (e.g., the platform certificate and the identity certificate) currently installed in an edge compute server 110 at the edge site 104. The ZTP server 118 can compare the currently installed certificates to certificates of the edge compute server 110 when the edge compute server 110 left the installation site 108. If the currently installed certificates do not match the certificates of the edge compute server 110 when the edge compute server 110 left the installation site 108, the ZTP server 118 can indicate a security violation condition. Checking the certificates currently installed in an edge compute server 110 is an example of how the ZTP server 118 can verify the edge compute server 110.

In further examples, verifying an edge compute server 110 can include checking user credentials (e.g., a username and password) and/or an authentication key on the edge compute server 110, to ensure that the user credentials and/or the authentication key matches predefined user credentials and/or an authentication key.

The ZTP server 118 also checks whether an intrusion detection sensor of an edge compute server 110 has been triggered. The intrusion detection sensor is used to detect physical tampering with the edge compute server 110. If the intrusion detection sensor outputs a signal indicating physical tampering with the edge compute server 110, the edge compute server 110 can store an indication of the triggered intrusion detection sensor in a secure memory that can later be checked. If the ZTP server 118 detects the indication of physical tampering, the ZTP server 118 can indicate that the edge compute server 110 has been tampered with.

The ZTP server 118 also checks the health of the edge compute servers 110, including monitoring metrics relating to resources such as processors, memories, storage drives, I/O cards, power supplies, and/or other components of the edge compute servers 110. If the ZTP server 118 detects that the metrics are out of range, the ZTP server 118 can indicate a health violation has occurred.

The ZTP server 118 also interacts with a security coprocessor, such as a Trusted Platform Module (TPM), to attest that the host OS 133, the firmware 135, and other programs have not been modified. If the ZTP server 118 detects that the host OS 133, the firmware 135, or other programs have been modified, the ZTP server 118 can indicate a program compromised condition in the edge compute server 110.

The ZTP server 118 can also check the host OS 133 of an edge compute server 110, including checking that the host OS 133 is accessible with a specified IP address and/or a specified credential (e.g., a username and password or a certificate). The ZTP server 118 can also check that all storage elements such as memories and storage devices are visible, and that network links are all active. If any of the foregoing is not true, the ZTP server 118 can indicate an access error condition.

The ZTP server 118 determines (at 212) whether the edge compute servers 110 have failed the integrity and health checks. In response to any of the edge compute servers 110 failing the integrity and health checks, the ZTP server 118 outputs (at 214) an error indication. If all of the edge compute servers 110 pass the integrity and health checks, the ZTP server 118 provisions (at 216) the edge compute servers 110. The provisioning of the edge compute servers 110 by the ZTP server 118 includes further configuring the edge compute servers 110, in addition to the basic configuration performed at the installation site 108.

The following describes examples of what further configurations of edge compute servers 110 can include. In other examples, different further configurations can be performed.

The further configuration of an edge compute server 110 includes programming the edge compute server 110 with an IP address, host name, and other network settings for the networks that the edge compute server 110 is to use to execute workloads for the customer at the edge site 104. The IP address, host name, and other network settings may be included in the network information of the stored network and security information 142 (FIG. 1). Examples of workloads can include workloads associated with software-defined storage (SDS). SDS stores data using logical storage resources that are abstracted from underlying physical storage resources, such as disk-based drives, solid state drives, nonvolatile memories, or other storage components. In other examples, other types of workloads can be deployed in virtualized environments (e.g., VMs) executed across the edge compute servers 110.

The further configuration of an edge compute server 110 can also include setting up virtual networks, such as VLANs, virtual storage area networks (VSANs), or other types of virtual networks. Virtual network information may be included in the network information of the stored network and security information 142. In some examples, the virtual networks can be used to support workloads across virtualized environments (e.g., VMs, containers, etc.) executed on multiple edge compute servers 110. The virtual networks can also be used to migrate virtualized environments across edge compute servers 110.

The further configuration of the edge compute servers 110 can also include setting up a cluster of hypervisors 134 that can cooperate to execute workloads on multiple edge compute servers 110. For example, the ZTP server 118 can create the cluster of hypervisors 134, such as by interacting with a hypervisor manager. An example of a hypervisor manager is VMware's vCenter Server, which supports the management of multiple hypervisors executed on respective machines. In other examples, other hypervisor managers can be employed, such as RedHat Enterprise Virtualization Manager (RHEV-M) and Microsoft System Center Virtual Machine Manager. The ZTP server 118 can contact the hypervisor manager, such as by issuing API calls to the API of the hypervisor manager, to create the cluster of hypervisors 134 and to set up a virtual network (e.g., a VSAN, a VLAN, or other type of virtual network) between VMs started by the cluster of hypervisors 134. The ZTP server 118 can also configure, based on cooperating with the hypervisor manager, the cluster of hypervisors 134 to operate in high availability mode. High availability mode refers to a mode in which in case an edge compute server becomes unavailable for any reason, the VMs on that edge compute server can be migrated to one or more other edge compute servers on which the cluster of hypervisors 134 execute.

More generally, the ZTP server 118 can contact a virtualization manager (such as the hypervisor manager noted above or a manager associated with containers) to create a cluster of virtualization programs.

The further configuration of the edge compute servers 110 can also include changing from using dynamic IP addresses to static IP addresses, in examples where the edge compute servers initially use dynamic IP addresses (such as dynamic IP addresses assigned to one or more of network adapters of the BMCs 137, and/or physical or virtual network adapters of the edge compute servers 110). The static IP addresses may be included in the network information of the stored network and security information 142.

The further configuration of the edge compute servers 110 can also include changing credentials of the edge compute servers 110, such as changing passwords, certificates, or other credentials. The credentials may be included in the security information of the stored network and security information 142.

Note that the further configurations of the edge compute servers 110 by the ZTP server 118 do not involve loading the program images 132 that have already been pre-loaded at the installation site 108. As a result, the further configurations by the ZTP server 118 do not involve communicating relatively large files containing the program images 132 to the edge compute servers 110 at the edge site 104, which reduces the burden on network resources of the network to the edge site 104, and reduces the amount of time in configuration operations of the ZTP server 118.

In addition to the further configurations of the edge compute servers 110, the ZTP server 118 can further set up (at 218) the edge control plane 122 at the edge site 104. The edge control plane 122 can be implemented using one or more VMs executed on one or more edge compute servers 110. Alternatively, the edge control plane 122 can be implemented in a computer system (including one or more computers) that is separate from the edge compute servers 110. The ZTP server 118 configures the edge control plane 122 with a personality, which includes one or more IP addresses. The edge control plane 122 is able to communicate with the data center control plane 116.

Various tasks of the data center control plane 116 can be offloaded to the edge control plane 122, so that the data center control plane 116 is not burdened with such tasks. For example, the collection of logs and telemetry data with respect to operations of the edge compute servers 110 at the edge site 104 can be performed at the edge control plane 122 rather than at the data center control plane 116. Telemetry data can include metrics relating to the usage and/or performance of resources (e.g., processor usage or performance metrics, storage usage or performance metrics, information relating to errors or faults, network latency metrics, or other metrics). Logs can include information relating to activities of entities, such as VMs or other entities, in the edge compute servers 110.

The edge control plane 122 may also include a DNS (Domain Name System) server 160 and/or an NTP (Network Time Protocol) server 162. The edge compute servers 110 at the edge site 104 can contact the DNS server 160 and the NTP server 162 at the edge control plane 122, instead of the DNS server and the NTP server at the data center control plane 116, to reduce latency associated with DNS and NTP operations. The DNS server 160 and the NTP server 162 in the edge control plane 122 can synchronize with the DNS server and the NTP server in the data center control plane 116.

The logs and telemetry data collected by the edge control plane 122 can be stored in a persistent storage system at the edge site 104, so that the logs and telemetry data are not lost even if the connection to the data center control plane 116 is lost. The collected logs and telemetry data may be synchronized with the data center control plane 116. The synchronization of the collected logs and telemetry data to the data center control plane 116 can be performed in multiple stages to avoid overwhelming the network connection between the edge site 104 and the customer data center 102.

Alternatively, instead of synchronizing all of the collected logs and telemetry data with the data center control plane 116, the edge control plane 122 can send a small subset of the logs and telemetry data (selected by applying a filter on the logs and telemetry data, for example) to the data center control plane 116. If a fault or error were to occur at the edge site 104, the data center control plane 116 can retrieve the remainder of the collected logs and telemetry data from the edge control plane 122 to determine the cause of the fault or error.

In other examples, the edge control plane 122 may be inactive unless a connection to the data center control plane 116 is lost. If the connection to the data center control plane 116 is lost, then the edge control plane 122 can take over control tasks that would have been performed by the data center control plane 116, to allow the edge compute servers 110 to continue to operate.

Loss of a connection to the data center control plane 116 may cause the edge compute servers 110 to no longer function properly. For example, if the edge compute servers 110 are unable to access the NTP server at the data center control plane 116, time drift may occur since the edge compute servers 110 may no longer be able to synchronize their time clocks to a time source provided by the NTP server. This time drift may result in errors for workloads that depend upon accurate times from time clocks of the edge compute servers 110. When the customer data center 102 is not available, the edge compute servers 110 can access the NTP server 162 in the edge control plane 122 to perform time clock synchronization.

As another example, if the edge compute servers 110 are unable to access the DNS server at the data center control plane 116, workloads would not be able to obtain IP addresses for domain names. When the customer data center 102 is not available, the edge compute servers 110 can access the DNS server 160 in the edge control plane 122 to resolve domain names to IP addresses.

Including the DNS server 160 and the NTP server 162 in the edge control plane 122 allows NTP and DNS functions to continue to be available even if a connection to the data center control plane 116 is lost.

In some examples, the presence of the edge control plane 122 can reduce the ingress and egress of information to and from the edge site 104 to help reduce the impact of cluster and workload operations on network bandwidth of the network to the edge site 104.

As noted above, online indications indicating that the edge compute servers 110 are online can be received by the ZTP server 118 from any of various sources. In some examples, the sources may include the edge compute servers 110 themselves. When the edge compute servers 110 are initially started, the edge compute servers 110 (e.g., the BMCs 137 in the edge compute servers 110) may send DHCP requests to a DHCP server (e.g., 120 in FIG. 1). The ZTP server 118 may detect such DHCP requests sent to the DHCP server, and the DHCP requests are used as the online indications indicating that the edge compute servers 110 are online.

Figure 3:
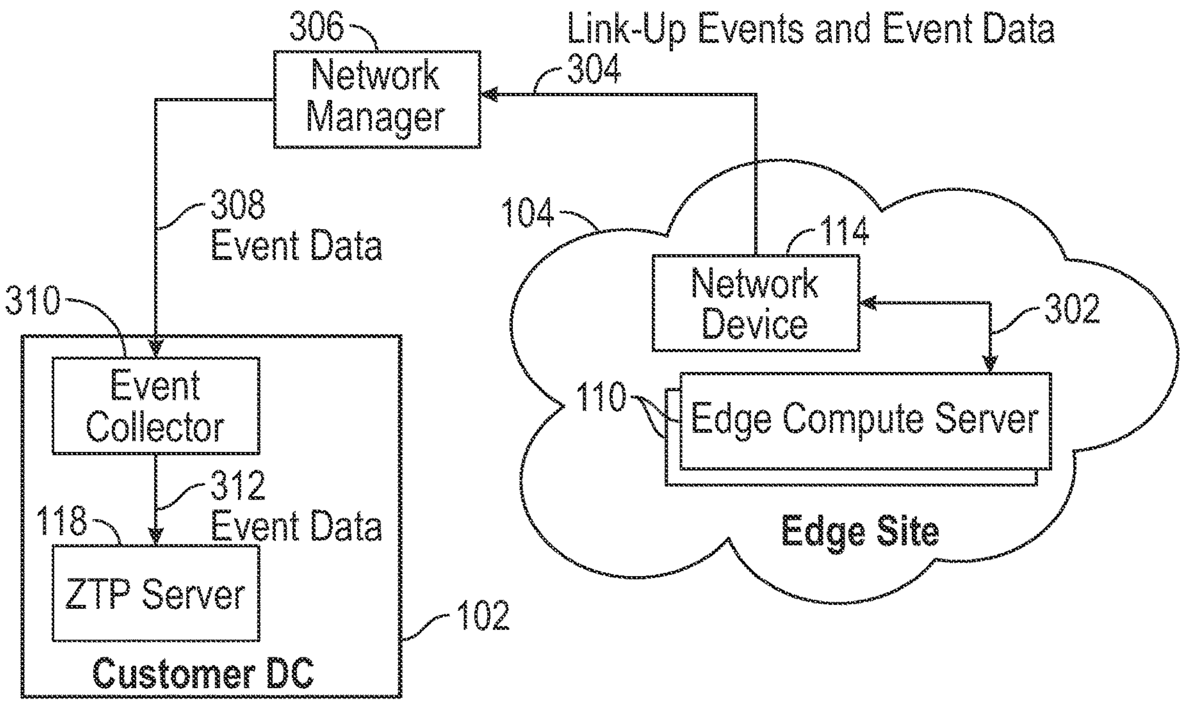
FIG. 3 and FIG. 4 are block diagrams of arrangements to provide online indications indicating that edge compute servers have been deployed and are online, according to some examples.

In further examples, as shown in FIG. 3, a source of the online indications can include a network device 114 (or multiple network devices 114) at the edge site 104. When the edge compute servers 110 are initially started and connect over links 302 to a network device 114, the network device 114 can send events and event data 304, indicating that links to the network device 114 have become active. These events can be referred to as "link-up events." In addition to the link-up events (which include notifications of the links becoming active), the event data can include information of the edge compute servers 110. For example, the event data can include Link Layer Discovery Protocol (LLDP) information. LLDP allows devices to advertise their device information to another entity. In other examples, the event data can have a different form.

The link-up events and event data 304 can be sent by the network device 114 to a network manager 306, which manages networks that include the network device 114. The network manager 306 can forward the event data 308 to an event collector 310 at the customer data center 102. The event collector 310 may be part of the data center control plane 116, for example. The event collector 310 may be implemented with machine-readable instructions, or with hardware processing circuitry.

The event collector 310 in turn forwards the event data 312 to the ZTP server 118. The ZTP server 118 detects information of the edge compute servers 110 in the event data 312, which indicates that the edge compute servers 110 are online.

In other examples, the network device 114 can forward the event data directly to the ZTP server 118, or to the event collector 310.

Although FIG. 3 shows one network device 114 sending the link-up events and event data 304, in other examples, multiple network devices 114 can send the link-up events and event data 304.

Figure 4:
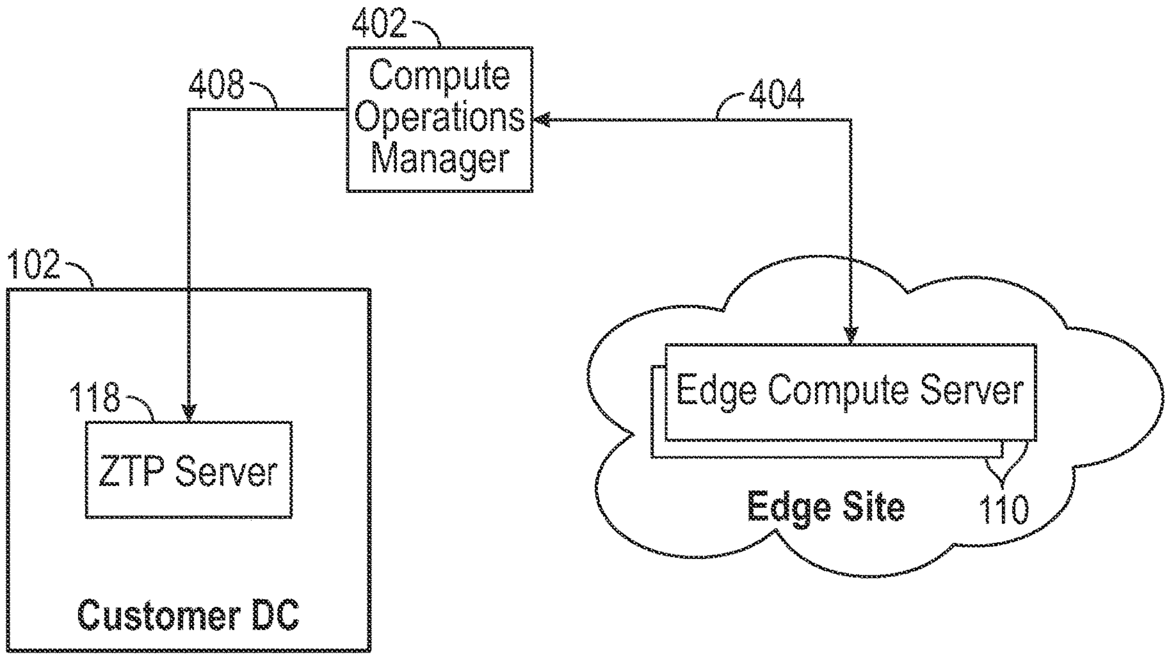

FIG. 4 shows a different example in which a source of the online indications for the edge compute servers 110 is a compute operations manager 402 that is used to access, monitor, and manage services at compute servers. The compute operations manager 402 can be implemented using machine-readable instructions executed in the cloud, for example. When the edge compute servers 110 start up, the edge compute servers 110 establish a connection 404 with the compute operations manager 402. The established connection 404 allows the compute operations manager 402 to access, monitor, and manage services at the edge compute servers 110.

The compute operations manager 402 can provide a notification 408 to the ZTP server 118 of the presence of the edge compute servers 110. This notification 408 provides online indications for the edge compute servers 110.

Figure 5:
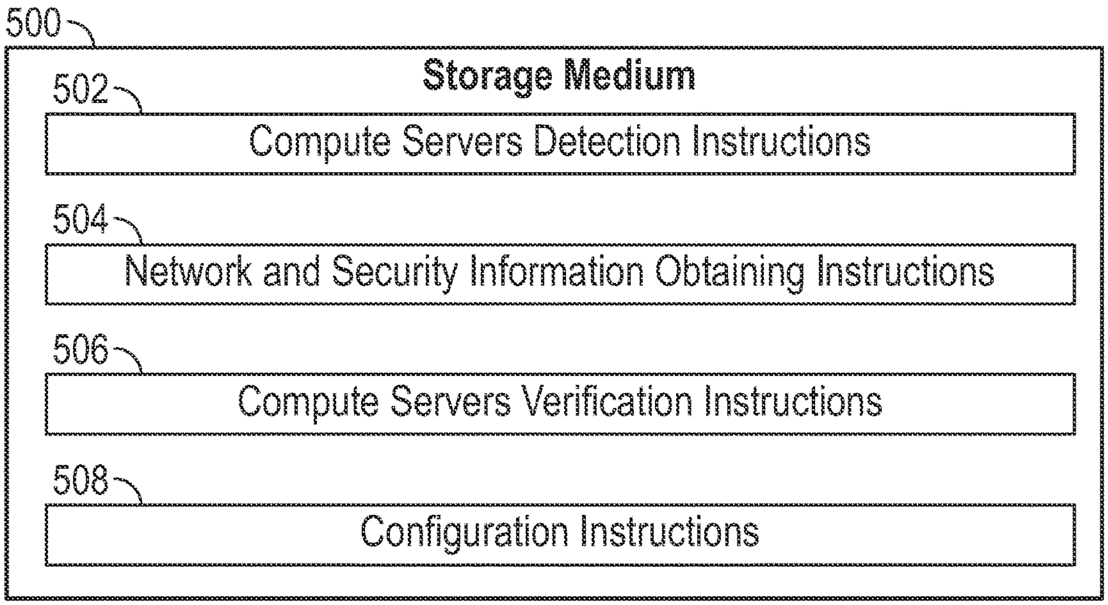
FIG. 5 is a block diagram of a storage medium storing machine-readable instructions according to some examples.

FIG. 5 is a block diagram of a non-transitory machine-readable or computer-readable storage medium 500 storing machine-readable instructions of a provisioning service that upon execution cause a system to perform various tasks. The provisioning service may include a service of the ZTP server 118 of FIG. 1, for example.

The machine-readable instructions include compute servers detection instructions 502 to detect, at the provisioning service, that a plurality of compute servers are online at an edge site (e.g., 104 in FIG. 1). The plurality of compute servers are pre-loaded with virtualization programs (e.g., hypervisors, container engines, etc.) by an automation server (e.g., 130 in FIG. 1) at an installation site (e.g., 108 in FIG. 1) different from the edge site.

The machine-readable instructions include network and security information obtaining instructions 504 to obtain, at the provisioning service, network information and security information of the plurality of compute servers from a data repository (e.g., 140 in FIG. 1). The network information and the security information are uploaded to the data repository by the automation server at the installation site.

The network information can include network addresses, such as MAC addresses, of the compute servers. The network information can also include configuration information relating to the network devices of the edge site. The security information can include security parameters.

The machine-readable instructions include compute servers verification instructions 506 to verify, by the provisioning service, the plurality of compute servers using the security information obtained from the data repository. The verification can be based on user credentials, authentication keys, and/or certificates in the security information, for example.

The machine-readable instructions include configuration instructions 508 to, after the verifying of the plurality of compute servers, perform, by the provisioning service, a configuration process to set up a cluster of the virtualization programs in the plurality of compute servers. The configuration process uses the network information obtained from the data repository. The configuration process can include the further configurations discussed above.

In some examples, the network information includes MAC addresses of the plurality of compute servers. The machine-readable instructions can configure IP addresses for the plurality of compute servers based on the MAC addresses. For example, the configuring of the IP addresses includes providing the IP addresses to a DHCP server (e.g., 120 in FIG. 1).

In some examples, the machine-readable instructions can perform, by the provisioning service, a check of the plurality of compute servers, where the check can include integrity and health checks, such as those performed at 210 in FIG. 2. For example, the check can include a determination that an intrusion detection sensor at a compute server of the plurality of compute servers has not been triggered, or a check of the health of the plurality of compute servers, or a check that a program in a compute server of the plurality of compute servers has not been modified, or a check that a host OS of a compute server of the plurality of compute servers is accessible at a specified IP address, or any other check discussed further above.

In some examples, the configuration process to set up the cluster of the virtualization programs in the plurality of compute servers includes interacting, by the provisioning service with a virtualization manager (e.g., a hypervisor manager) to set up a cluster of hypervisors.

In some examples, the configuration process to set up the cluster of the virtualization programs includes setting up the cluster of the virtualization programs in a high availability mode.

In some examples, the cluster of the virtualization programs is to support the performance of a workload across virtualized environments in the plurality of compute servers.

In some examples, the machine-readable instructions can further set up an edge control plane (e.g., 122 in FIG. 1) at the edge site. The edge control plane can collect telemetry data and log data. A portion of the telemetry data and log is to be synchronized with a remote control plane at a remote location, such as a customer data center (e.g., 102 in FIG. 1).

In some examples, the edge control plane enables the plurality of compute servers to continue to operate when the edge site is disconnected from the remote location, such as due to a network failure or due to the remote location being down.

Figure 6:
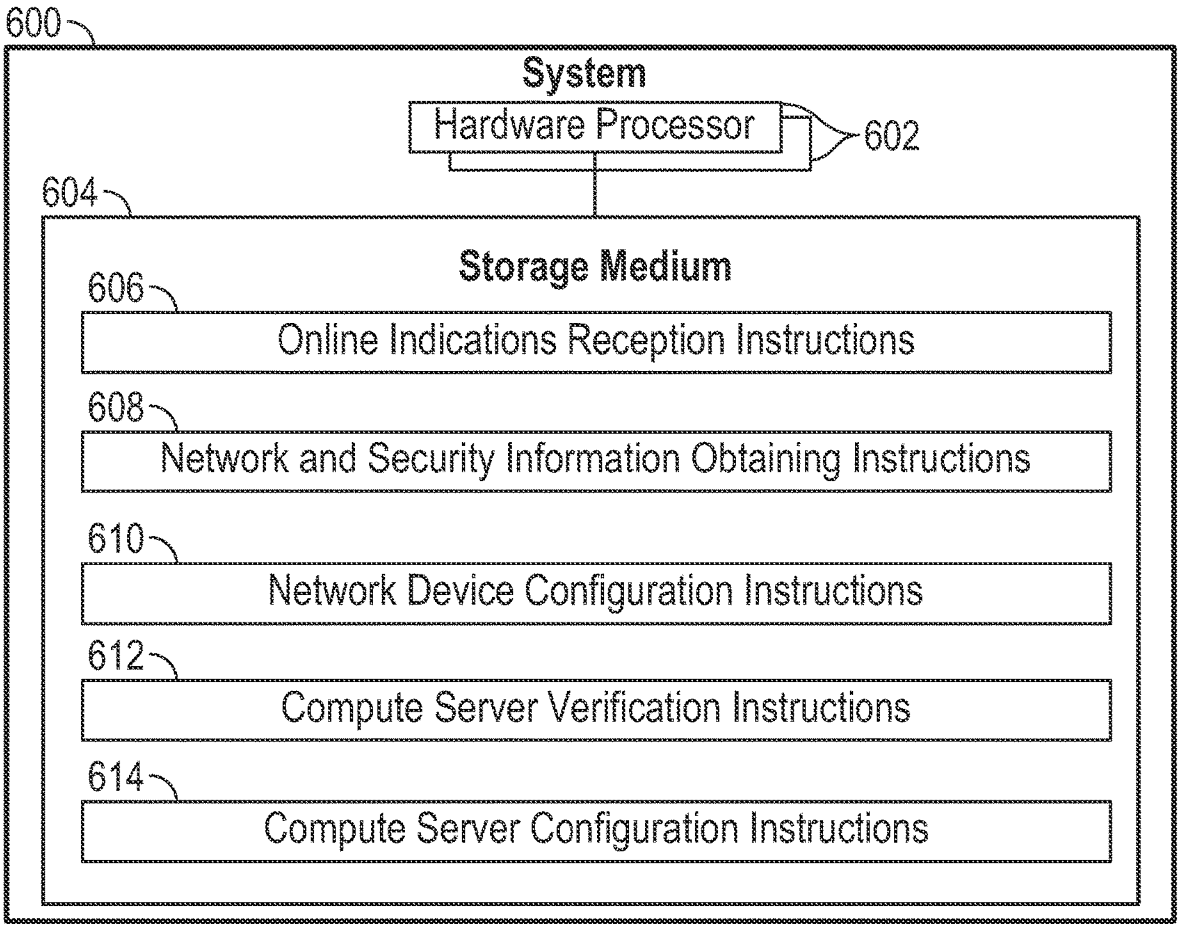
FIG. 6 is a block diagram of a system according to some examples.

FIG. 6 is a block diagram of a system 600 according to some examples. The system 600 can be implemented using one or more computers, for example. The system 600 includes one or more hardware processors 602. A hardware processor can include a microprocessor, a core of a multi-core microprocessor, a microcontroller, a programmable integrated circuit, a programmable gate array, or another hardware processing circuit.

The system 600 further includes a non-transitory storage medium 604 storing machine-readable instructions of a provisioning service that are executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include online indications reception instructions 606 to receive, at the provisioning service, online indications that a plurality of compute servers are online at an edge site (e.g., 104 in FIG. 1). The plurality of compute servers are pre-loaded with virtualization programs at an installation site different from the edge site. The plurality of compute servers are configured with a setting to access a network address configuration server that assigns network addresses. For example, the network address configuration server can be the DHCP server 120 of FIG. 1. The setting can be a setting of a virtual switch, such as the virtual switch 138 of FIG. 1.

The machine-readable instructions in the storage medium 604 include network and security information obtaining instructions 608 to obtain, at the provisioning service, network information and security information of the plurality of compute servers from a data repository. The network information and the security information are uploaded to the data repository by an automation server at the installation site.

The machine-readable instructions in the storage medium 604 include network device configuration instructions 610 to configure a network device at the edge site using the network information to support communications between the plurality of compute servers at the edge site and the provisioning service. The configuration of the network device may be part of the configuration at 204 in FIG. 2.

The machine-readable instructions in the storage medium 604 include compute server verification instructions 612 to verify, by the provisioning service, the plurality of compute servers using the security information obtained from the data repository.

The machine-readable instructions in the storage medium 604 include compute server configuration instructions 614 to, after the verifying of the plurality of compute servers, perform, by the provisioning service, a configuration process to set up a cluster of the virtualization programs in the plurality of compute servers, where the configuration process uses the network information obtained from the data repository.

In some examples, the machine-readable instructions can further set up an edge control plane at the edge site, the edge control plane to collect telemetry data and log data, where a portion of the telemetry data and log data is to be synchronized with a remote control plane at a remote data center. The edge control plane can include one or more of a DNS server or an NTP server to operate responsive to the remote data center being unavailable.

Figure 7:
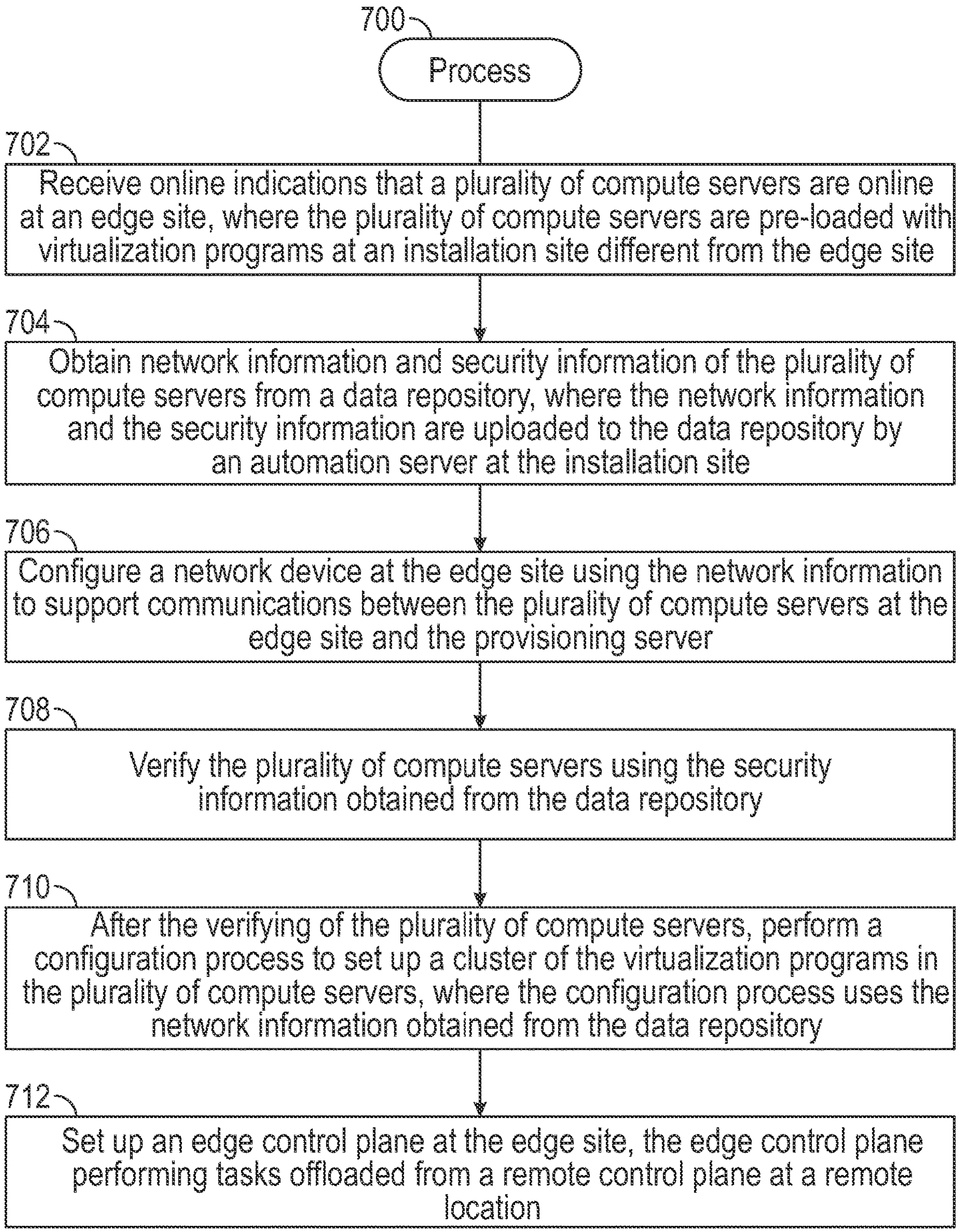
FIG. 7 is a flow diagram of a process according to some examples.

FIG. 7 is a flow diagram of a process 700 according to some examples. The process 700 may be performed by a system such as the ZTP server 118 of FIG. 1.

The process 700 includes receiving (at 702), at a provisioning server (e.g., the ZTP server 118 of FIG. 1), online indications that a plurality of compute servers are online at an edge site. The plurality of compute servers are pre-loaded with virtualization programs at an installation site different from the edge site. In some examples, the plurality of compute servers may further be pre-loaded with a host OS and/or firmware.

The process 700 includes obtaining (at 704), by the provisioning server, network information and security information of the plurality of compute servers from a data repository. The network information and the security information are uploaded to the data repository by an automation server at the installation site.

The process 700 includes configuring (at 706), by the provisioning server, a network device at the edge site using the network information to support communications between the plurality of compute servers at the edge site and the provisioning server.

The process 700 includes verifying (at 708), by the provisioning server, the plurality of compute servers using the security information obtained from the data repository. The verification can be based on one or more of user credentials, authentication keys, or certificates in the security information.

The process 700 includes, after the verifying of the plurality of compute servers, performing (at 710), by the provisioning server, a configuration process to set up a cluster of the virtualization programs in the plurality of compute servers. The configuration process uses the network information obtained from the data repository. The configuration process can include any of the further configurations performed by the ZTP server 118 discussed above.

The process 700 includes setting up (at 712), by the provisioning server, an edge control plane at the edge site, the edge control plane performing tasks offloaded from a remote control plane at a remote location. The remote location can be a customer data center, for example. The offloaded tasks can include tasks that would have been performed by a control plane at the customer data center. The offloaded tasks can include collecting log data and telemetry data. Additionally, the offloaded tasks can include tasks of a DNS server and/or an NTP server.

A "BMC" (e.g., the BMC 137 of FIG. 1) can refer to a specialized service controller that monitors the physical state of a computer system (e.g., an edge compute server) using sensors and communicates with a remote management system (that is remote from the computer system) through an independent "out-of-band" connection. The BMC can perform management tasks to manage components of the computer system. Examples of management tasks that can be performed by the BMC can include any or some combination of the following: power control to perform power management of the computer system (such as to transition the computer system between different power consumption states in response to detected events), thermal monitoring and control of the computer system (such as to monitor temperatures of the computer system and to control thermal management states of the computer system), fan control of fans in the computer system, system health monitoring based on monitoring measurement data from various sensors of the computer system, remote access of the computer system (to access the computer system over a network, for example), remote reboot of the computer system (to trigger the computer system to reboot using a remote command), system setup and deployment of the computer system, system security to implement security procedures in the computer system, and so forth.

In some examples, the BMC can provide so-called "lights-out" functionality for a computer system. The lights out functionality may allow a user, such as a systems administrator, to perform management operations on the computer system even if an OS is not installed or not functional on the computer system.

Moreover, in some examples, the BMC can run on auxiliary power provided by an auxiliary power supply (e.g., a battery); as a result, the computer system does not have to be powered on to allow the BMC to perform the BMC's operations. The auxiliary power supply is separate from a main power supply that supplies powers to other components (e.g., a main processor, a memory, an input/output (I/O) device, etc.) of the computer system.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions of a provisioning service that upon execution cause a system to:

detect, at the provisioning service, that a plurality of compute servers are online at an edge site, wherein the plurality of compute servers are pre-loaded with virtualization programs by an automation server at an installation site different from the edge site;

obtain, at the provisioning service, network information and security information of the plurality of compute servers from a data repository, the network information and the security information uploaded to the data repository by the automation server at the installation site;

configure a network device at the edge site using the network information to support communications between the plurality of compute servers at the edge site and the provisioning service, wherein the configuring of the network device comprises configuring a virtual network based on the network information at one or more ports of the network device;

verify, by the provisioning service, the plurality of compute servers using the security information obtained from the data repository; and after the verifying of the plurality of compute servers, perform, by the provisioning service, a configuration process to set up a cluster of the virtualization programs in the plurality of compute servers, wherein the virtualization programs of the cluster are to start virtualized environments across which a workload is performed, and the configuration process sets up the virtual network between the virtualized environments based on the network information obtained from the data repository.

2. The non-transitory machine-readable storage medium of claim 1, wherein the network information comprises Media Access Control (MAC) addresses of the plurality of compute servers, and wherein the instructions upon execution cause the system to:

configure Internet Protocol (IP) addresses for the plurality of compute servers based on the MAC addresses.

3. The non-transitory machine-readable storage medium of claim 2, wherein the configuring of the IP addresses comprises providing the IP addresses to a Dynamic Host Configuration Protocol (DHCP) server.

4. The non-transitory machine-readable storage medium of claim 1, wherein the instructions upon execution cause the system to:

perform, by the provisioning service, a check of the plurality of compute servers, wherein the check comprises a determination that an intrusion detection sensor at a compute server of the plurality of compute servers has not been triggered.

5. The non-transitory machine-readable storage medium of claim 4, wherein the check further comprises a check of a health of the plurality of compute servers.

6. The non-transitory machine-readable storage medium of claim 4, wherein the check further comprises a check that a program in a compute server of the plurality of compute servers has not been modified.

7. The non-transitory machine-readable storage medium of claim 4, wherein the check further comprises a check that an operating system (OS) of a compute server of the plurality of compute servers is accessible at a specified Internet Protocol (IP) address.

8. The non-transitory machine-readable storage medium of claim 1, wherein the configuration process to set up the cluster of the virtualization programs in the plurality of compute servers comprises interacting, by the provisioning service with a virtualization manager to set up a cluster of hypervisors.

9. The non-transitory machine-readable storage medium of claim 1, wherein the configuration process to set up the cluster of the virtualization programs comprises setting up the cluster of the virtualization programs in a high availability mode.

10. The non-transitory machine-readable storage medium of claim 1, wherein the configuration process further comprises switching between use of dynamic Internet Protocol (IP) addresses and static IP addresses by the plurality of compute servers.

11. The non-transitory machine-readable storage medium of claim 1, wherein the instructions upon execution cause the system to:

set up an edge control plane at the edge site, the edge control plane to collect telemetry data, wherein a portion of the telemetry data is to be synchronized with a remote control plane at a remote location.

12. The non-transitory machine-readable storage medium of claim 11, wherein the edge control plane is to enable the plurality of compute servers to continue to operate when the edge site is disconnected from the remote location.

13. The non-transitory machine-readable storage medium of claim 11, wherein the edge control plane comprises a Domain Name System (DNS) server accessible by the plurality of compute servers responsive to the remote control plane being unavailable.

14. The non-transitory machine-readable storage medium of claim 11, wherein the edge control plane comprises a Network Time Protocol (NTP) server accessible by the plurality of compute servers responsive to the remote control plane being unavailable.

15. The non-transitory machine-readable storage medium of claim 1, wherein the virtualization programs comprise hypervisors, and wherein the configuration process to set up the cluster of the virtualization programs in the plurality of compute servers comprises a configuration process to set up a cluster of hypervisors in the plurality of compute servers, and the virtualized environments comprise virtual machines started by the cluster of hypervisors.

16. The non-transitory machine-readable storage medium of claim 1, wherein the instructions upon execution cause the system to:

verify the plurality of compute servers using the security information obtained from the data repository by verifying the plurality of compute servers using one or more of user credentials, authentication keys, or certificates on the plurality of compute servers.

17. A system comprising:

a hardware processor; and a non-transitory storage medium storing instructions of a provisioning service that are executable on the hardware processor to:

receive, at the provisioning service, online indications that a plurality of compute servers are online at an edge site, wherein the plurality of compute servers are pre-loaded with virtualization programs at an installation site different from the edge site, and the plurality of compute servers are configured with a setting to access a network address configuration server that assigns network addresses;

obtain, at the provisioning service, network information and security information of the plurality of compute servers from a data repository, the network information and the security information uploaded to the data repository by an automation server at the installation site;

configure a network device at the edge site using the network information to support communications between the plurality of compute servers at the edge site and the provisioning service, wherein the configuring of the network device comprises configuring a virtual network based on the network information at one or more ports of the network device;

verify, by the provisioning service, the plurality of compute servers using the security information obtained from the data repository; and after the verifying of the plurality of compute servers, perform, by the provisioning service, a configuration process to set up a cluster of the virtualization programs in the plurality of compute servers, wherein the configuration process uses the network information obtained from the data repository, the virtualization programs of the cluster are to start virtualized environments across which a workload is performed, and the configuration process sets up the virtual network between the virtualized environments based on the network information.

18. The system of claim 17, wherein the instructions are executable on the hardware processor to:

set up an edge control plane at the edge site, the edge control plane to collect telemetry data, wherein a portion of the telemetry data is to be synchronized with a remote control plane at a remote data center, and wherein the edge control plane comprises one or more of a Domain Name System (DNS) server or a Network Time Protocol (NTP) server to operate responsive to the remote data center being unavailable.

19. A method comprising:

receiving, at a provisioning server comprising a hardware processor, online indications that a plurality of compute servers are online at an edge site, wherein the plurality of compute servers are pre-loaded with virtualization programs at an installation site different from the edge site;

obtaining, by the provisioning server, network information and security information of the plurality of compute servers from a data repository, the network information and the security information uploaded to the data repository by an automation server at the installation site;

configuring, by the provisioning server, a network device at the edge site using the network information to support communications between the plurality of compute servers at the edge site and the provisioning server, wherein the configuring of the network device comprises configuring a virtual network based on the network information at one or more ports of the network device;

verifying, by the provisioning server, the plurality of compute servers using the security information obtained from the data repository;

after the verifying of the plurality of compute servers, performing, by the provisioning server, a configuration process to set up a cluster of the virtualization programs in the plurality of compute servers, wherein the virtualization programs of the cluster are to start virtualized environments across which a workload is performed, and the configuration process sets up the virtual network between the virtualized environments based on the network information obtained from the data repository; and setting up, by the provisioning server, an edge control plane at the edge site, the edge control plane performing tasks offloaded from a remote control plane at a remote location.

20. The method of claim 19, wherein the online indications are from the plurality of compute servers, or from the network device at the edge site, or from an operations manager that the plurality of compute servers connect with.

* * * * *